(12) United States Patent
An et al.

(10) Patent No.: US 10,656,469 B2
(45) Date of Patent: May 19, 2020

(54) RUBBING ALIGNMENT DEVICE

(71) Applicants: BOE TECHNOLOGY GROUP CO., LTD., Beijing (CN); BEIJING BOE DISPLAY TECHNOLOGY CO., LTD., Beijing (CN)

(72) Inventors: Wuwei An, Beijing (CN); Jaegwan Shin, Beijing (CN); Xu Wang, Beijing (CN); Hongye Zuo, Beijing (CN); Jiangzhou Du, Beijing (CN); Nan Liu, Beijing (CN); Xufeng Liu, Beijing (CN); Yan Zhao, Beijing (CN)

(73) Assignees: BOE TECHNOLOGY GROUP CO., LTD., Beijing (CN); BEIJING BOE DISPLAY TECHNOLOGY CO., LTD., Beijing (CN)

( * ) Notice: Subject to any disclaimer, the term of this patent is extended or adjusted under 35 U.S.C. 154(b) by 247 days.

(21) Appl. No.: 15/531,699

(22) PCT Filed: Oct. 13, 2016

(86) PCT No.: PCT/CN2016/101974
§ 371 (c)(1),
(2) Date: May 30, 2017

(87) PCT Pub. No.: WO2017/128769
PCT Pub. Date: Aug. 3, 2017

(65) Prior Publication Data
US 2018/0088417 A1   Mar. 29, 2018

(30) Foreign Application Priority Data

Jan. 29, 2016   (CN) .......................... 2016 1 0066071

(51) Int. Cl.
B23P 19/00 (2006.01)
G02F 1/1337 (2006.01)
G02F 1/1333 (2006.01)

(52) U.S. Cl.
CPC .. *G02F 1/133784* (2013.01); *G02F 1/133351* (2013.01); *Y10T 29/53261* (2015.01)

(58) Field of Classification Search
CPC ............. G02F 1/133784; G02F 1/1303; G02F 1/13378; B29C 66/83413; B29C 55/18;
(Continued)

(56) References Cited

U.S. PATENT DOCUMENTS 5,455,695 A    10/1995  Kodera et al.
7,016,000 B2 *  3/2006  Kuan ................ G02F 1/133784
                                                        349/126
(Continued)

FOREIGN PATENT DOCUMENTS

CN         1627161 A      6/2005
CN       202083860 U     12/2011
(Continued)

OTHER PUBLICATIONS

Office Action received for Chinese Patent Application No. 201610066071.0, dated Jan. 29, 2018, 22 pages (12 pages of English Translation and 10 pages of Office Action).
(Continued)

*Primary Examiner* — Thiem D Phan
(74) *Attorney, Agent, or Firm* — Womble Bond Dickinson (US) LLP

(57) ABSTRACT

A rubbing alignment device, assembly and a rubbing alignment method are disclosed. The rubbing alignment device comprises a friction member including at least two friction rollers, and a friction member controller connected to the friction member for controlling respective friction rollers of
(Continued)

the friction member to perform rubbing alignment for the substrates of the motherboard having different sizes, respectively.

8 Claims, 6 Drawing Sheets

(58) Field of Classification Search
CPC ............ B29C 66/83511; Y10T 428/10; Y10T 428/1005; Y10T 29/53261; C08J 5/18
USPC ............... 29/759, 238, 283.5, 720, 771, 779
See application file for complete search history.

(56) References Cited

U.S. PATENT DOCUMENTS

| | | | |
|---|---|---|---|
| 8,840,533 B2* | 9/2014 | Prushinskiy | G02F 1/1303 15/230 |
| 2005/0128405 A1 | 6/2005 | Lee | |

FOREIGN PATENT DOCUMENTS

| | | | |
|---|---|---|---|
| CN | 203133445 | * | 8/2013 |
| CN | 203133445 U | | 8/2013 |
| CN | 104035236 A | | 9/2014 |
| CN | 105467688 A | | 4/2016 |
| KR | 20100078258 A | | 7/2010 |

OTHER PUBLICATIONS

International Search Report and Written Opinion in PCT/CN2016/101974 dated Dec. 30, 2016, with English translation.

* cited by examiner

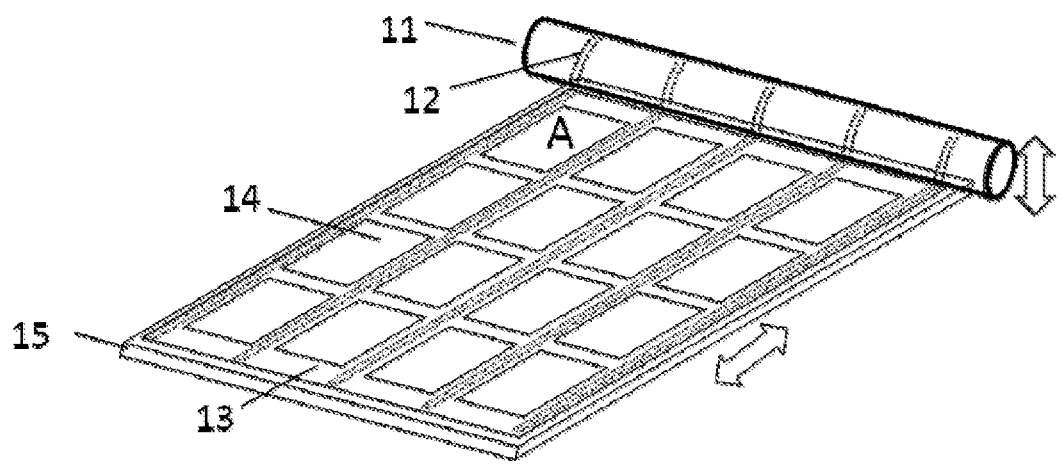
Fig.1 --prior art--
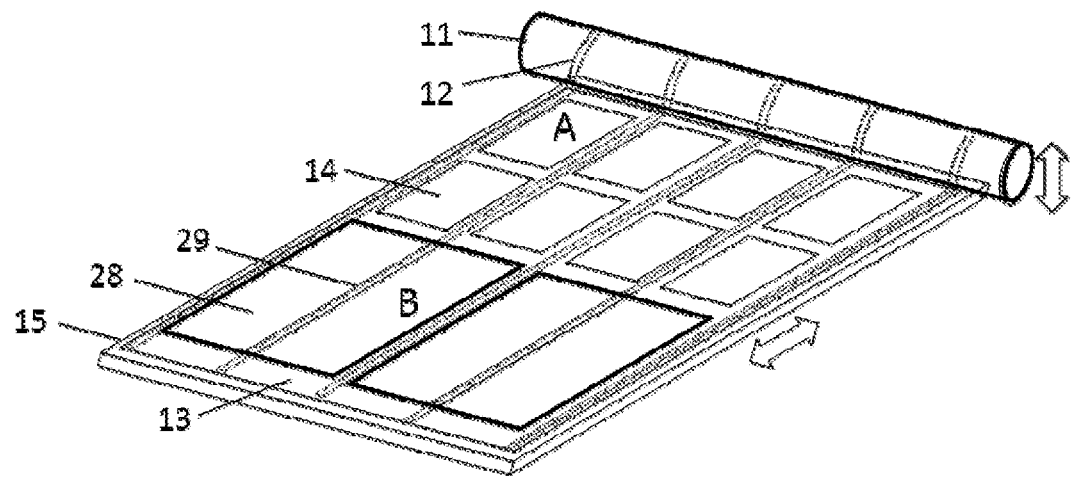
Fig.2 --prior art--

RUBBING ALIGNMENT DEVICE

RELATED APPLICATION

The present application is the U.S. national phase entry of PCT/CN2016/101974, with an international filling date of Oct. 13, 2016, which claims the benefit of Chinese Patent Application No. 201610066071.0, filed on Jan. 29, 2016, the entire disclosure of which is incorporated herein by reference.

FIELD OF THE DISCLOSURE

The present disclosure relates to a rubbing alignment device, assembly and a rubbing alignment method, as well as a display substrate and a display device.

BACKGROUND

During manufacturing process for the liquid crystal substrate, to enable the liquid crystal molecules to form a certain pretilt angle, there is a need to perform rubbing alignment for the alignment film on the substrate.

As the size of the liquid crystal substrate becomes larger, the size of the motherboard used in the rubbing alignment process also increases, but the utilization rate of the motherboard is reduced. The motherboard is usually divided into multiple substrates. The region where the substrate resides is an effective region of the motherboard, which is to be manufactured into a liquid crystal substrate, while the region between adjacent substrates is an ineffective region of the motherboard, which is to be discarded after cell alignment and cutting. The proportion of the area of the effective regions in the total area of the motherboard is the utilization rate of the motherboard. For example, in case the size of a motherboard is 2200 mm×2500 mm, the utilization rate thereof is 75% when it is cut into 43-inch substrates, and the utilization rate thereof is 84.95% when it is cut into 46-inch substrates. In order to increase the utilization rate of the motherboard, it is possible to generate substrates having different sizes from one and the same motherboard. For example, when substrates having sizes of 43 inches and 18.5 inches are generated simultaneously from one motherboard, the utilization rate of the motherboard is 90.3%.

However, the existing rubbing alignment device is only applicable to rubbing for a motherboard which is divided into a plurality of identical substrates arranged uniformly. If different substrates of one and the same motherboard are rubbed, the difference between different substrates would affect the uniformity in rubbing alignment, thereby affecting the liquid crystal alignment, resulting in an abnormality in the displayed image.

FIGS. 1 and 2 are schematic views showing existing rubbing alignment for a substrate. As shown in FIG. 1 or 2, a friction roller 11 ascends or descends in the direction of the arrow under the effect of an elevator (not shown). Since there is a significant difference in the thickness between the effective region and the ineffective region of the motherboard, an imprint 12 that coincides with the boundary between the effective region and the ineffective region would be formed on the friction cloth of the friction roller during rubbing alignment. However, referring to FIG. 2, in case the distribution of the effective regions and the ineffective regions in a rear section of the motherboard is different from that in a front section of the motherboard, or multiple substrates of different sizes are distributed on one and the same motherboard, such friction cloth with imprint will leave an imprint in the effective region during rubbing alignment for the rear section of the motherboard, thus affecting the quality of the liquid crystal panel, resulting in poor or abnormal display. Therefore, when the existing rubbing alignment device performs rubbing for a motherboard divided into multiple different substrates, the uniformity in rubbing alignment would be affected, which in turn would have a great influence on the uniformity of the liquid crystal alignment, resulting in poor panel quality, etc.

SUMMARY

In order to alleviate or mitigate the problem that when the existing rubbing alignment device performs rubbing alignment for a motherboard comprising various substrates, it would affect the uniformity of rubbing alignment, which in turn greatly impact on the uniformity of the liquid crystal alignment, resulting in poor panel quality, etc, embodiments of the present disclosure provide a rubbing alignment device, assembly and a rubbing alignment method, as well as a display substrate and a display device.

The rubbing alignment device provided by embodiments of the present disclosure can perform rubbing alignment for a motherboard comprising a plurality of substrates having different sizes. The rubbing alignment device comprises a friction member including at least two friction rollers and a friction member controller. The friction member controller is connected to the friction member for controlling respective friction rollers of the friction member to perform rubbing alignment for the substrates having different sizes of the motherboard respectively.

In an embodiment, the friction member further comprises an elevating mechanism corresponding to each of the friction rollers, the friction roller including a rotation shaft and a friction cloth on the rotation shaft. The friction member controller comprises a first controller connected to the rotation shaft of the friction roller for driving the friction roller to rotate, and a second controller connected to the elevating mechanism for driving the elevating mechanism to ascend or descend.

In an embodiment, the friction member comprises two friction rollers arranged side by side, the elevating mechanism corresponding to each of the friction rollers is arranged symmetrically on two sides of each of the friction rollers for controlling the friction roller to ascend or descend.

In an embodiment, the friction member comprises N friction rollers, the friction member further comprises a central rotation shaft and a connection shaft. The N friction rollers are arranged at intervals around the central rotation shaft, each of the friction rollers is connected to the central rotation shaft through the connection shaft, an angle between adjacent connection shafts is 360°/N, N being a positive integer and N≥2. The friction member controller further comprises a third controller connected to the central rotation shaft for controlling rotation of the central rotation shaft, the central rotation shaft is further connected to the elevating mechanism.

In an embodiment, the elevating mechanism comprises a roller clamping device, a support beam, a connection structure, a transmission member and a limit sensor, the roller clamping device being connected to the rotation shaft of the friction roller, the support beam being located between the roller clamping device and the connection structure, the transmission member being connected to the second controller.

In an embodiment, the transmission member comprises a first wedge-shaped slider, a second wedge-shaped slider, a support rail, a slider and a threaded screw rod, the first wedge-shaped slider and the second wedge-shaped slider being located on two sides of the support rail, the threaded screw rod being connected to the second controller for driving the slider to slide on the support rail, thereby effecting ascending or descending of the friction roller.

In an embodiment, the friction member comprises N friction rollers, the friction member further comprises a connection shaft and a central rotation shaft. The N friction rollers are arranged at intervals around the central rotation shaft, each of the friction rollers is connected to the central rotation shaft through the connection shaft, an angle between adjacent connection shafts is 360°/N, N being a positive integer and N≥2, each friction roller includes a rotation shaft and a friction cloth on the rotation shaft. The friction member controller comprises a first controller connected to the rotation shaft for driving the friction roller to rotate, and a third controller connected to the central rotation shaft for controlling rotation of the central rotation shaft to effect ascending or descending of the friction roller.

Another embodiment of the present disclosure further provides a rubbing alignment assembly. The rubbing alignment assembly comprises a rubbing alignment device as described in any one of the foregoing embodiments, a machine for transporting the motherboard, and a machine controller. The starting position of the machine is a coordinate origin, the machine controller is connected to the friction member controller via a signal line for receiving coordinate information of the machine, controlling operation of the machine and transmitting a signal to the friction member controller. The friction member controller controls the friction member to ascend or descend based on the coordinate information of the machine.

Another embodiment of the present disclosure further provides a method of performing rubbing alignment using the rubbing alignment assembly as described in the foregoing embodiments, comprising steps of:

determining a starting position of the machine, the starting position being used as a coordinate origin for the machine, and determining a coordinate of the friction member; obtaining, by the machine controller, coordinate information of the machine when the machine is in operation, and transmitting, by the machine controller, a signal to the friction member controller based on the coordinate information; controlling, by the friction member controller, the friction member to ascend or descend to perform rubbing alignment for the motherboard.

In an embodiment, when the machine moves to a set coordinate, the machine controller transmits a signal to the friction member controller to thereby control the friction member to ascend or descend. The step of performing rubbing alignment for the motherboard comprises the following steps: when a gap between the substrates of the motherboard arrives at a position below one friction roller of the friction member, controlling, by the friction member controller, the friction roller of the friction member to descend to perform rubbing alignment, and after rubbing alignment is performed once for all the substrates, controlling, by the machine controller, the machine to operate in a reverse direction to perform second rubbing alignment for the substrates of the motherboard.

A further embodiment of the present disclosure provides a display substrate, the display substrate is prepared by means of the rubbing alignment device as described in any one of the foregoing embodiments.

Yet another embodiment of the present disclosure provides a display device comprising the display substrate as described in the above embodiment.

BRIEF DESCRIPTION OF THE DRAWINGS

FIG. 1 is a schematic view showing existing rubbing alignment for identical substrates;

FIG. 2 is a schematic view showing existing rubbing alignment for various different substrates;

DETAILED DESCRIPTION OF EMBODIMENTS

The technical solutions of embodiments of the present disclosure will be described clearly and comprehensively below with reference to the accompanying drawings. Obviously, the described embodiments are only part of the embodiments of the invention rather than all of them. All other embodiments obtained by those ordinarily skilled in the art based on the embodiments in the disclosure without inventive efforts fall within the scope of the invention.

Figure 3:
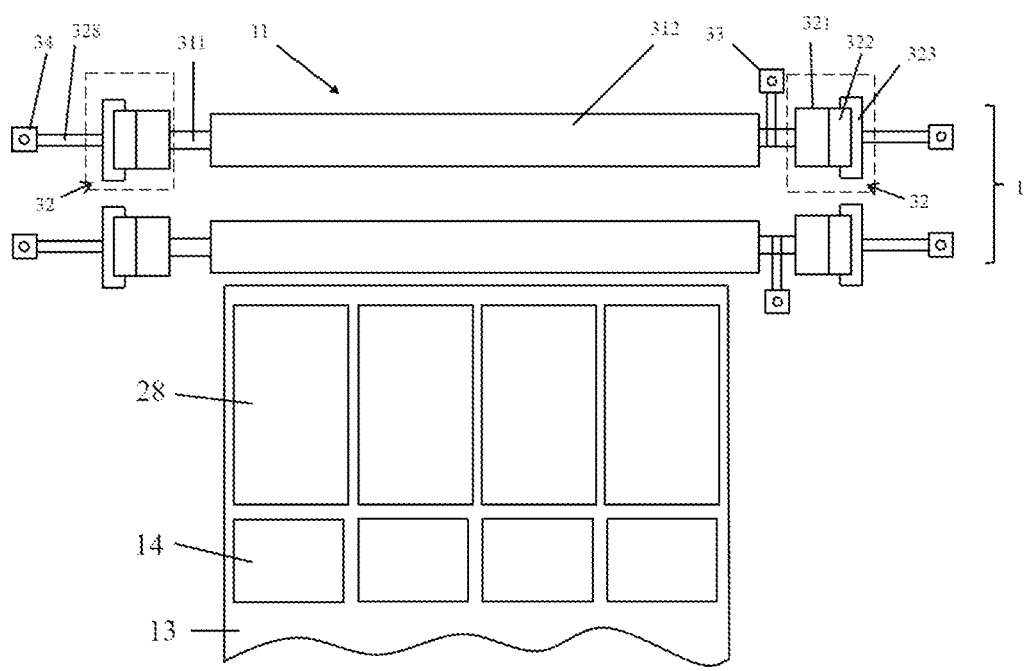
FIG. 3 is a schematic structural view of a rubbing alignment device according to an embodiment of the present disclosure.

As shown in FIG. 3, an embodiment of the disclosure provides a rubbing alignment device for performing rubbing alignment for a motherboard, which comprises a friction member 1 and a friction member controller. The friction member 1 comprises two friction rollers 11, and further comprises elevating mechanisms 32 symmetrically disposed on two sides of each of the friction rollers 11 for controlling the friction roller 11 to ascend or descend.

It is to be noted that, the term "ascend" used in the embodiments indicates getting away from the substrate, and the term "descend" indicates getting close to the substrate. In this embodiment, only one implementation is illustrated, and other approaches that can achieve getting away from or close to the substrate are included in the scope of the invention, which will not be described here for simplicity. This is also applicable to the following embodiments.

The friction member controller comprises a first controller 33 connected to the friction roller 11 for driving the friction roller 11 to rotate, and a second controller 34 connected to the elevating mechanism 32 for driving the elevating mechanism 32 to ascend or descend.

It is to be understood that the meaning of the term "connected" mentioned herein includes "direct connection" and "indirect connection". For example, an object A being connected to an object B may refer to the object A being directly connected to the object B, i.e. there is no other element between the object A and the object B, or the object A being indirectly connected to the object B, i.e. there are other elements between the object A and the object B.

Figure 4:
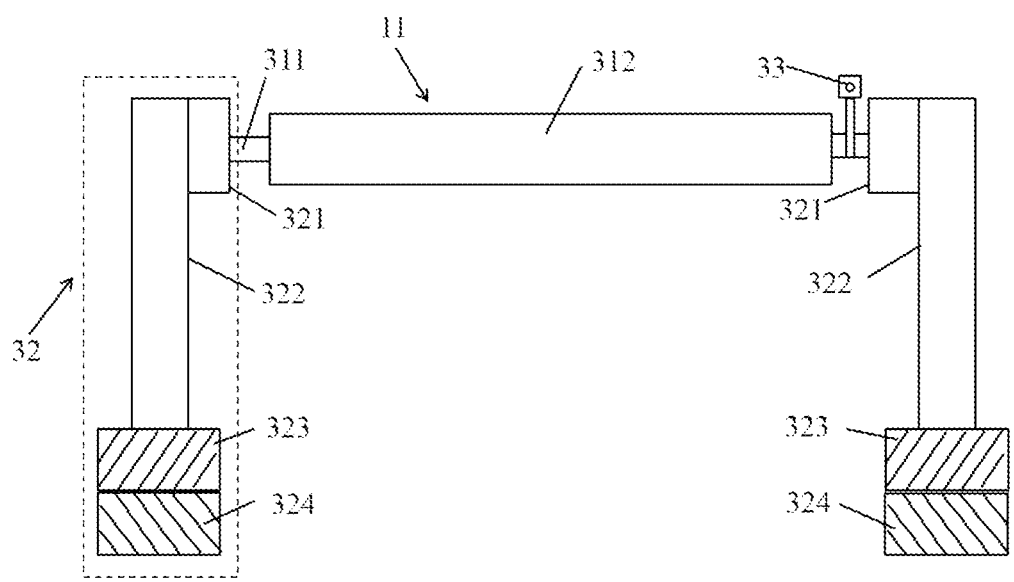
FIG. 4 is a schematic structural view of a friction member in FIG. 3.
Figure 5:
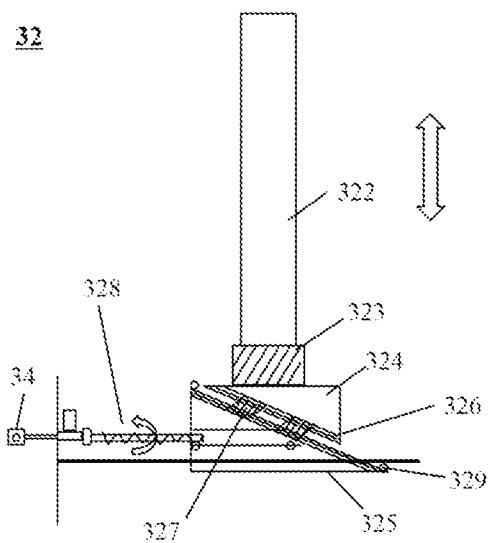
FIG. 5 is a partial enlarged view of an elevating mechanism of FIG. 4.

FIG. 4 is a schematic view showing the main structure of the friction member in FIG. 3, and FIG. 5 is a partial enlarged view of the elevating mechanism 32 in FIG. 4. The friction roller 11 comprises a rotation shaft 311 and a friction cloth 312 on the rotation shaft 311. The first controller 33 is connected to the rotation shaft 311 of the friction roller 11 for controlling the rotation of the friction roller 11. The elevating mechanism 32 comprises a roller clamping device 321, a support beam 322, a connection structure 323, a first wedge-shaped slider 324, a second wedge-shaped slider 325, a support rail 326, a slider 327, a threaded screw rod 328, and a limit sensor 329. The roller clamping device 321 is connected to the rotation shaft 311 of the friction roller 11 to ensure the stability of the roller during the ascending and descending processes. One end of the support beam 322 is connected to the roller clamping device 321 and the other end thereof is connected to the connection structure 323 for supporting the friction roller 11. The first wedge-shaped slider 324 is located between the connection structure 323 and the support rail 326. The slope surface of the second wedge-shaped slider 325 is connected to the support rail 326, and another surface thereof is connected to the threaded screw rod 328 which is further connected to the second controller 34. When the second controller 34 is actuated, the threaded screw rod 328 begins to rotate to thereby drive the slider 327 to slide on the support rail 326 such that the first wedge-shaped slider 324 and the second wedge-shaped slider 325 are close to or separated from each other, which in turn can control the support beam 322 to move upward or downward to effect ascending or descending of the friction roller 11. That is to say, the first wedge-shaped slider, the second wedge-shaped slider, the support rail, the slider and the threaded screw rod described above may constitute a transmission member. The limit sensor 329 may be provided on the slope surface of the second wedge-shaped slider 325 to define the boundary of movement of the slider 327 on the slope of the second wedge-shaped slider 325.

Figure 6:
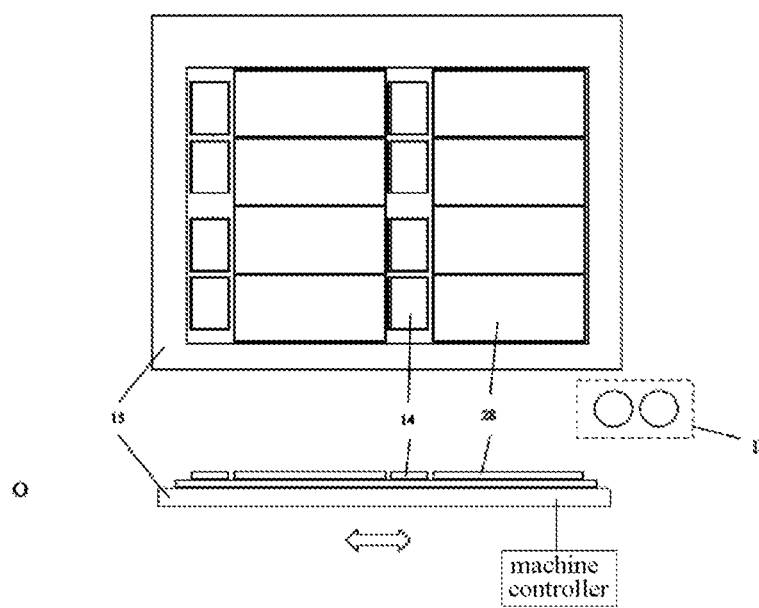
FIG. 6 is a schematic structural view of a rubbing alignment assembly according to an embodiment of the present disclosure.

Another embodiment of the disclosure provides a rubbing alignment assembly, as shown in FIG. 6. The rubbing alignment assembly comprises the rubbing alignment device (only the friction roller is shown in FIG. 6) as described in the above embodiment of the present disclosure, a machine 15 for transporting the motherboard and a machine controller. The starting position of the machine 15 is a coordinate origin O, whereby the coordinate of the machine 15 during operation can be determined. The machine controller is connected to the friction member controller in the rubbing alignment device via a signal line for receiving the coordinate information of the machine 15, controlling the operation of the machine 15 and transmitting a signal to the friction member controller. The friction member controller controls ascending or descending of the friction member 1 based on the coordinate information of the machine 15.

Figure 7:
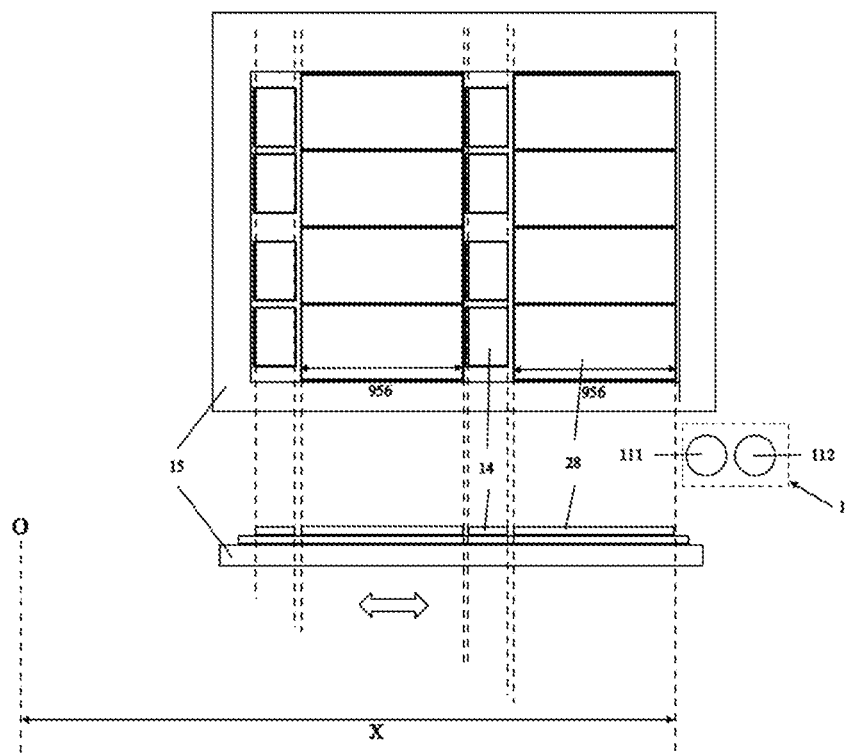
FIGS. 7 to 8 are schematic views showing steps of performing rubbing alignment using the rubbing alignment assembly of FIG. 6.
Figure 8:
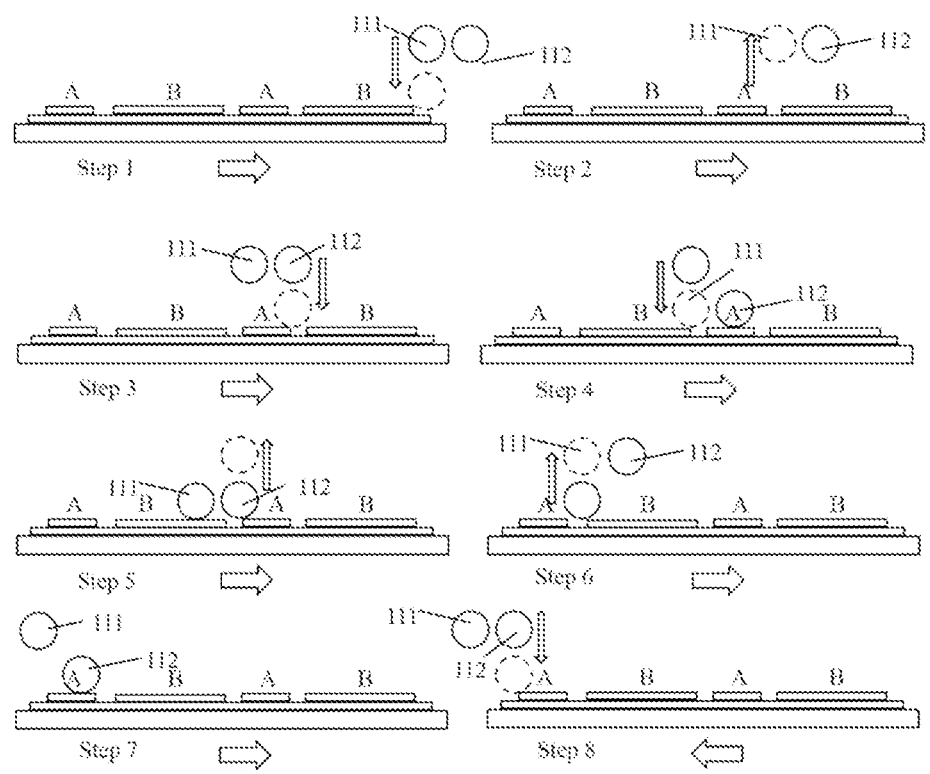

A further embodiment of the present disclosure provides a method of performing rubbing alignment for a motherboard. As shown in FIGS. 7 to 8, the method may comprise the following steps.

The starting position of the machine 15 is determined as the coordinate origin O for the machine 15, and the coordinate of the friction member 1 is determined based on the origin O. The machine controller controls the machine 15 to start operation and acquires in real time the coordinate position of the machine 15 during operation. The machine controller transmits a signal to the second controller for controlling the friction roller based on the coordinate information of the machine 15, and the second controller controls the friction roller to ascend or descend. When the friction roller has finished the ascending or descending action, the first controller controls the friction roller to rotate or stop rotation. This procedure is carried out in turn and circularly to accomplish rubbing alignment for different substrates of the motherboard.

To facilitate description of the ascending and descending of the friction roller, FIGS. 7 and 8 define two friction rollers arranged side by side as a first friction roller 111 and a second friction roller 112, respectively. The process of performing rubbing alignment is specifically described by taking the substrates 14, 28 of different sizes of the motherboard shown in FIG. 6 as an example.

It is assumed that the coordinate of the friction roller 111 is X.

Step 1: The machine starts operation. When a first group of substrates B (i.e. substrate 28) arranged on the machine arrive at a position below the first friction roller 111, i.e. the coordinate of the machine 15 is X (the coordinate of the machine 15 takes the coordinate value to which the side of the motherboard on the machine away from the origin corresponds), the second controller 34 controls the first friction roller 111 to descend to rub the first group of substrates B, and the position of the second friction roller 112 is kept unchanged.

Step 2: When the first friction roller 111 finishes rubbing for the first group of substrates B, the coordinate of the machine 15 at that time is X+956 (it is assumed that the width of the first group of substrates B having larger size is 956 mm), the second controller 34 controls the first friction roller 111 to ascend, and the position of the second friction roller 112 is still kept unchanged.

Step 3: When a first group of substrates A (i.e. substrate 14) move to a position below the second friction roller 112 (the coordinate information of the machine 15 can be determined in a similar manner), the second friction roller 112 descends under the control of the second controller 34 and starts to perform rubbing alignment for the first group of substrates A. At that time, the position of the first friction roller 111 is kept unchanged.

Step 4: During the process of rubbing the first group of substrates A by the second friction roller 112, a second group of substrates B move to a position below the first friction roller 111, at which time the first friction roller 111 descends and starts to rub the second group of substrates B.

Step 5: The second friction roller 112 starts to ascend when it finishes rubbing for the first group of substrates A. At that time, the first friction roller 111 continues to rub the second group of substrates B.

Step 6: When the first friction roller 111 starts to ascend when it finishes rubbing for the second group of substrates B, the second friction roller 112 has ascended and remains stationary.

Step 7: The first friction roller 111 ascends to the starting position and remains stationary. When a second group of substrates A move to a position below the second friction roller 112, the second friction roller 112 descends and performs rubbing alignment for the second group of substrates A until the end of the process.

Through the above seven steps, rubbing alignment has been carried out once for the motherboard shown in FIG. 6. The first friction roller 111 corresponds to the substrates B and the second friction roller 112 corresponds to the substrates A.

In a further embodiment, after rubbing alignment has been carried out once for the motherboard, the machine controller controls the machine to operate in a reverse direction and the above seven steps will be reversely performed in turn, i.e. the second friction roller 112 first rubs the second group of substrates A, and the first friction roller 111 then rubs the second group of substrates B. Subsequently, the second friction roller 112 further carries out rubbing alignment for the first group of substrates A, and the first friction roller 111 carries out rubbing alignment for the first group of substrates B. So far, rubbing alignment for a motherboard has been completely finished. Through the process in this embodiment, two friction rollers perform rubbing alignment for different substrates individually, thereby avoiding occurrence of deficiencies. At the same time, the operation of the machine in a reverse direction enables each substrate to be subjected to rubbing alignment twice, which ensures the rubbing strength and further ensures the product quality.

It is to be noted that the term "group" as used herein indicates substrates of the same size that are arranged successively, which may mean one or more substrate, or mean one row or multiple rows of substrates. The line where the "row" mentioned resides is perpendicular to the movement direction of the substrate. Of course, the arrangement of the substrates on the motherboard is not limited to those shown in the illustrated embodiments. Alternatively, all the substrates B may be arranged in a group, and all the substrates A may be arranged in a group, or otherwise, as long as the friction rollers can perform rubbing alignment for the substrates of different sizes individually, which all fall within the scope of the present invention and will not be described here for simplicity.

By performing rubbing alignment for the motherboard using the rubbing alignment device and the rubbing alignment assembly provided by embodiments of the present disclosure, rubbing alignment can be carried out for multiple substrates of different sizes, which can avoid poor display resulting from non-uniformity in rubbing alignment occurring in the conventional rubbing process. Moreover, ascending and descending of the friction member takes place during the operation of the machine, the machine does not need to stop, which can not only avoid waste of time caused by stopping the machine, but also effectively improve the precision of descending of the friction roller. In addition, utilizing the coordinate information of different substrates on the motherboard to control ascending and descending of the friction member reduces manual operations and some components for acquiring information about the shape and position of the substrate, leading to a simple structure of the rubbing alignment device.

Figure 9:
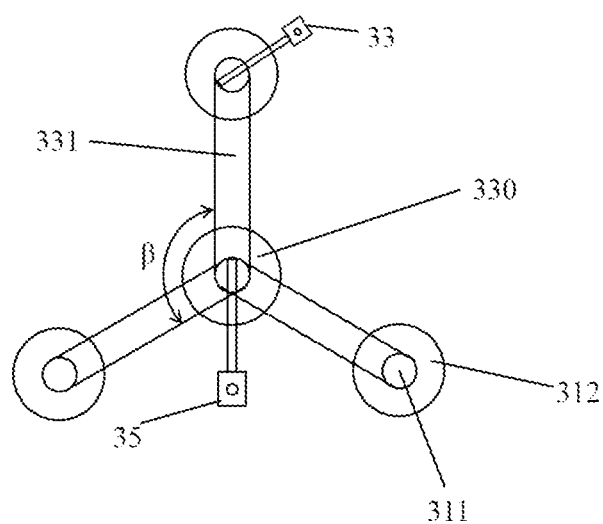
FIG. 9 is a schematic structural view of a friction member according to another embodiment of the present disclosure.

FIG. 9 is a schematic structural view of a rubbing alignment device provided by another embodiment of the present disclosure. In this embodiment, the friction member in the rubbing alignment device may comprise three friction rollers and a central rotation shaft 330. The friction rollers are disposed at intervals around the central rotation shaft 330 and connected to the central rotation shaft 330 by means of a connection shaft 331. The angle β between adjacent connection shafts 331 is approximately 120°. The structure of the friction roller is similar to that of the friction roller described in the foregoing embodiments, which includes a rotation shaft 311 and a friction cloth 312 on the rotation shaft 311.

The friction member controller in the rubbing alignment device comprises a first controller 33 and a third controller 35. The first controller 33 is connected to the rotation shaft 311 (for clarity, FIG. 9 only shows that one of the three friction rollers is connected to a first controller 33, actually, each of the friction rollers can be connected to a first controller 33) for driving the friction roller to rotate. The third controller 35 is connected to the central rotation shaft 330 for driving the central rotation shaft 330 to rotate, thereby realizing ascending or descending of the friction roller.

In the rubbing alignment device provided by the present embodiment, each of the friction rollers may correspond to substrates of one size. Therefore, the rubbing alignment device provided by the present embodiment can perform rubbing alignment for the motherboard on which substrates of three sizes are arranged simultaneously.

Although the embodiment shown in FIG. 9 includes three friction rollers, it is to be appreciated that in other embodiments two or more friction rollers may be included, the structures and the connection relationships of which are similar to those in this embodiment. When the number of friction rollers is N, the angle β between adjacent connection shafts is 360°/N, where N is a positive integer and N≥2.

In the case where a plurality of such friction members are included, since each of the friction members comprises multiple friction rollers, when the friction roller or controller in one of the friction members involves faults or defects, rubbing alignment for other substrates would not be affected, and the friction roller that involves faults or defects can be replaced conveniently. Furthermore, in addition to enabling the machine to perform reciprocating operation in forward and reverse directions as previously discussed, it is also possible to enable the friction rollers in different friction members to cooperate with each other to rub the same substrate multiple times, which can enhance the rubbing strength for the substrate and improve the production efficiency.

Based on the same inventive concept, a further embodiment of the present disclosure provides a rubbing alignment assembly comprising the rubbing alignment device as described in the foregoing embodiments, a machine for transporting the motherboard and a machine controller. The starting position of the machine can be a coordinate origin, whereby the coordinate of the machine during operation can be determined. The machine controller is connected to the friction member controller via a signal line, for receiving the coordinate information of the machine, controlling operation of the machine and transmitting a signal to the friction member controller. The friction member controller controls the friction member to ascend or descend based on the coordinate information of the machine.

On the basis of the embodiment of the rubbing alignment device as shown in FIG. 9, a further embodiment of the present disclosure provides a method of performing rubbing alignment for a motherboard. The method may comprise the following processes.

Determining the starting position of the machine as the coordinate origin for the machine, whereby the coordinate of the friction member is determined based on the origin. The machine controller controls the machine to start operation and acquires in real time the coordinate position of the machine during operation. The machine controller transmits a signal based on the coordinate information of the machine to the third controller that controls the friction member. The third controller controls the central rotation shaft to rotate such that the friction roller ascends or descends. When the friction roller has finished ascending or descending, the first controller controls the friction roller to rotate or stop rotation. This procedure is carried out in turn and circularly to accomplish rubbing alignment for different substrates.

The process of implementing rubbing alignment by means of the rubbing alignment device shown in FIG. 9 is similar to that in the embodiment described with reference to FIGS. 7 and 8. The differences lie in that the friction rollers arranged side by side in FIGS. 7 and 8 are replaced in the present embodiment by multiple friction rollers arranged at intervals around the central rotation shaft. The ascending and descending of the friction rollers in the foregoing embodiment are realized by the elevating mechanism, while the ascending and descending of the friction rollers in the present embodiment are realized by rotation of the central rotation shaft. Other processes are similar and will not be described here for simplicity.

By performing rubbing alignment for the motherboard using the rubbing alignment device and the rubbing alignment assembly provided by embodiments of the present disclosure, rubbing alignment can be carried out for multiple substrates of different sizes, which avoids poor display resulting from non-uniformity of the alignment film generated in the conventional rubbing process. Moreover, ascending and descending of the friction member takes place during the movement of the machine, and the machine does not need to stop, which can not only avoid waste of time caused by stopping the machine, but also effectively improve the precision of descending of the friction roller. The friction member including a plurality of friction rollers can achieve rubbing alignment for multiple different substrates individually, thereby overcoming the problem in the prior art that rubbing alignment can be only carried out for identical substrates. In addition, utilizing the coordinate information of different substrates on the motherboard to control ascending and descending of the friction member reduces manual operations or some components for acquiring information about the shape and position of the substrate, making the structure of the rubbing alignment device simple.

Figure 10:
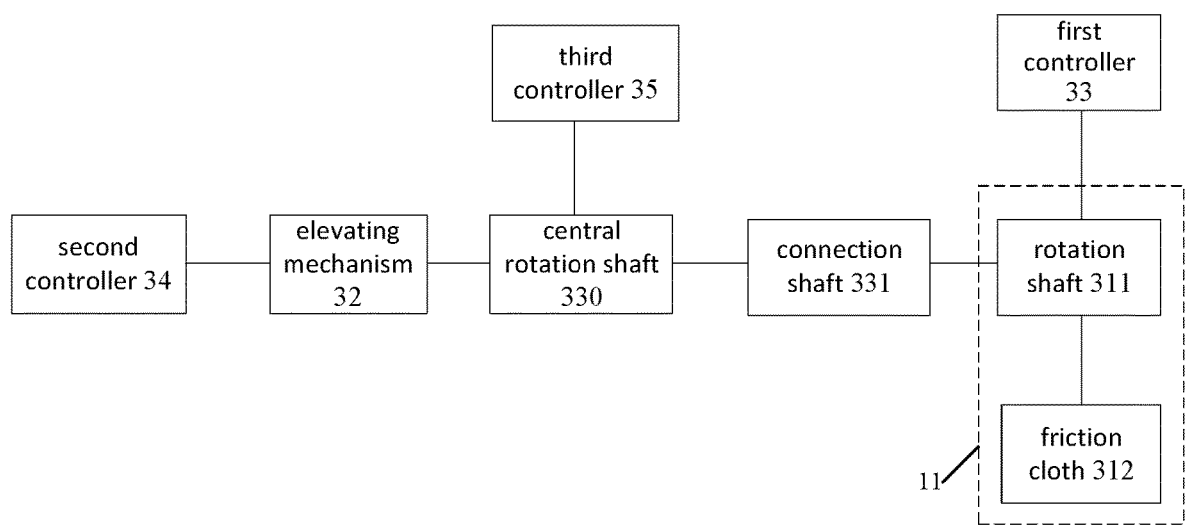
FIG. 10 is a schematic view showing a connection between a friction member and a friction member controller in a rubbing alignment device according to a further embodiment of the present disclosure.

FIG. 10 schematically shows a rubbing alignment device according to yet another embodiment of the present disclosure for performing rubbing alignment for a substrate of the motherboard. The rubbing alignment device comprises a friction member and a friction member controller. The structure and connection relationship of the friction member are similar to those in the embodiment shown in FIG. 9 except that the friction member in the present embodiment is added with the elevating mechanism 32 and the second controller 34 as compared with the embodiment shown in FIG. 9. The second controller 34 is connected to the elevating mechanism 32 for controlling the elevating mechanism to ascend or descend. As shown in FIG. 10, for the sake of brevity, the structural constitution of the rubbing alignment device is schematically shown in block diagrams.

In an embodiment, the friction member may comprise three friction rollers 11 (one friction roller 11 is schematically shown in FIG. 10) and a central rotation shaft 330. The friction roller 11 is connected to the central rotation shaft 330 via a connection shaft 331. The friction rollers 11 are disposed at intervals around the central rotation shaft 330. The angle between adjacent connection shafts 331 is approximately 120°. The friction member further comprises an elevating mechanism 32 which is connected to the central rotation shaft 330 for controlling the central rotation shaft 330 to ascend or descend.

In this embodiment, the friction member controller comprises a first controller 33, a second controller 34 and a third controller 35. The first controller 33 is connected to the friction roller 11 for driving the friction roller 11 to rotate, the second controller 34 is connected to the elevating mechanism 32 for driving the elevating mechanism 32 to ascend or descend, and the third controller 35 is connected to the central rotation shaft 330 for driving the central rotation shaft 330 to rotate. In this way, when the second controller 34 controls movement of the elevating mechanism 32 to drive the central rotation shaft 330 to ascend or descend to a predetermined position, the third controller 35 can control the central rotation shaft 330 to rotate so as to determine a friction roller that is to perform rubbing alignment, and subsequently, the first controller 33 can control the determined friction roller to rotate and start operation. Therefore, in this embodiment, the second controller 34 and the third controller 35 can control ascending and descending of the friction roller jointly.

In this embodiment, the structures of the friction roller 11 and the elevating mechanism 32 may be the same as those of the friction roller and the elevating mechanism described in the foregoing embodiments, which will not be described here for simplicity. The embodiment describes the friction member that has three friction rollers as an example. In practice, the number of friction rollers can be set according to actual need, which is not restricted herein. That is, the number of friction rollers may be N, and the angle between adjacent connection shafts is 360°/N, where N is a positive integer and N≥2.

The connections between the first controller 33 and the rotation shaft 311 of the friction roller, between the second controller 34 and the elevating mechanism 32, and between the third controller 35 and the central rotation shaft 330 have also been described in the foregoing embodiments, and the connection between the elevating mechanism 32 and the central rotation shaft 330 may be similar to that between the elevating mechanism 32 and the rotation shaft of the friction roller as described in the embodiments shown in FIGS. 3-6, which will not be described here in detail.

Based on the same inventive concept, another embodiment of the present disclosure further provides a rubbing alignment assembly comprising the rubbing alignment device in the embodiment described with reference to FIG. 10, a machine for transporting the motherboard and a machine controller. The starting position of the machine is determined as a coordinate origin, whereby the coordinate of the machine during operation can be determined. The machine controller is connected to the friction member controller via a signal line so as to receive the coordinate information of the machine, control operation of the machine, and transmit a signal to the friction member controller to thereby control ascending or descending of the friction member. The friction member controller controls the friction member to ascend or descend based on the coordinate information of the machine.

On the basis of the embodiment of the rubbing alignment device according to the present disclosure as shown in FIG. 10, a further embodiment of the present disclosure provides a method of performing rubbing alignment for a motherboard. The method may comprise the following steps.

The starting position of the machine is determined as the coordinate origin of the machine, and the coordinate of the friction member is determined based on the origin. The machine controller controls the machine to start operation and acquires in real time the coordinate position of the machine during operation. The machine controller transmits a signal to at least one of the second controller and the third controller of the friction member controller based on the coordinate information of the machine, and the controller that receives the signal enables the friction roller to ascend or descend by controlling the structure connected thereto.

When the friction roller has finished the ascending or descending action, the first controller controls the friction roller to rotate or stop rotation. This procedure is carried out in turn and circularly to accomplish rubbing alignment for different substrates.

The specific process of performing rubbing alignment may be similar to the process in the embodiment described with reference to FIGS. 7 and 8. The differences lie in that the friction rollers arranged side by side in FIGS. 7 and 8 are replaced in the present embodiment by multiple friction rollers arranged at intervals around the central rotation shaft, and the ascending and descending of the friction rollers in the foregoing embodiment are realized by the elevating mechanism, while the ascending and descending of the friction rollers in this embodiment can be realized by either rising and falling of the elevating mechanism or rotation of the central rotation shaft, or a combination of both. Such configuration is advantageous to improving the precision of ascending and descending of the friction rollers. In addition, when one of the control manners fails, the friction rollers can be further controlled by the other control manner to ascend or descend so as to perform rubbing alignment, which extends the service life of the device and facilitates maintenance and replacement. Other structure arrangements and processes in this embodiment are all similar to those in the foregoing embodiments and will not be described here for simplicity.

In conclusion, by performing rubbing alignment for the motherboard using the rubbing alignment device and system provided by embodiments of the present disclosure, rubbing alignment can be carried out for multiple different substrates, which avoids poor display resulting from non-uniformity of the alignment film generated in the conventional rubbing process. Moreover, continuous ascending and descending of the friction member take place during the movement of the machine, the machine does not need to stop, which can not only avoid waste of time caused by stopping the machine, but also effectively improve the precision of descending of the friction roller. The friction member including a plurality of friction rollers can achieve rubbing alignment for multiple different substrates, thereby solving the problem in the prior art that rubbing alignment can be only carried out for identical substrates. In addition, utilizing the coordinate information of different substrates on the motherboard to control ascending and descending of the friction member reduces manual operations or other components for acquiring information about the shape and position of the substrate, thereby making the structure of the rubbing alignment device simple, reducing the cost, and improving the competitiveness of the product in the market.

A further embodiment of the present disclosure provides a display substrate which is prepared by means of the rubbing alignment device according to any one of the forgoing embodiments of the present disclosure.

Yet another embodiment of the present disclosure provides a display device comprising the display substrate as described in the above embodiment.

Variations to the disclosed embodiments can be understood and effected by the skilled person in practicing the disclosure, from a study of the drawings, the description, and the appended claims. In the claims, the word "comprises" or "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A rubbing alignment device comprising: a friction member, the friction member comprising at least two friction rollers, and
  a friction member controller,
  wherein the friction member controller is connected to the friction member for controlling respective friction rollers of the friction member to perform rubbing alignment for substrates having different sizes of a motherboard respectively,
  wherein the friction member further comprises an elevating mechanism corresponding to each of the friction rollers, the friction roller including a rotation shaft and a friction cloth on the rotation shaft,
  wherein the friction member controller comprises a first controller connected to the rotation shaft of the friction roller for driving the friction roller to rotate, and a second controller connected to the elevating mechanism for driving the elevating mechanism to ascend or descend,
  wherein the elevating mechanism comprises a roller clamping device, a support beam, a connection structure, a transmission member and a limit sensor, the roller clamping device being connected to the rotation shaft of the friction roller, the support beam being located between the roller clamping device and the connection structure, the transmission member being connected to the second controller.

2. The rubbing alignment device according to claim 1, wherein the friction member comprises two friction rollers arranged side by side, the elevating mechanism corresponding to each of the friction rollers is arranged symmetrically on two sides of each of the friction rollers for controlling the friction roller to ascend or descend.

3. The rubbing alignment device of claim 1, wherein the transmission member comprises a first wedge-shaped slider, a second wedge-shaped slider, a support rail, a slider and a threaded screw rod, the first wedge-shaped slider and the second wedge-shaped slider being located on two sides of the support rail, the threaded screw rod being connected to the second controller for driving the slider to slide on the support rail, thereby effecting ascending or descending of the friction roller.

4. A rubbing alignment assembly comprising:
  the rubbing alignment device as defined in claim 1 and configured to perform rubbing alignment for a motherboard, the motherboard comprising a plurality of substrates having different sizes,
  a machine for transporting the motherboard,
  and a machine controller,
  wherein a starting position of the machine is a coordinate origin, the machine controller is connected to the friction member controller via a signal line for receiving coordinate information of the machine, controlling operation of the machine and transmitting a signal to the friction member controller, the friction member controller controls the friction member to ascend or descend based on the coordinate information of the machine.

5. The rubbing alignment assembly according to claim 4, wherein the friction member comprises two friction rollers arranged side by side, the elevating mechanism corresponding to each of the friction rollers is arranged symmetrically on two sides of each of the friction rollers for controlling the friction roller to ascend or descend.

6. The rubbing alignment assembly of claim 4, wherein the transmission member comprises a first wedge-shaped slider, a second wedge-shaped slider, a support rail, a slider and a threaded screw rod, the first wedge-shaped slider and the second wedge-shaped slider being located on two sides of the support rail, the threaded screw rod being connected to the second controller for driving the slider to slide on the support rail, thereby effecting ascending or descending of the friction roller.

7. A rubbing alignment device comprising: a friction member, the friction member comprising at least two friction rollers, and
   a friction member controller,
   wherein the friction member controller is connected to the friction member for controlling respective friction rollers of the friction member to perform rubbing alignment for substrates having different sizes of a motherboard respectively,
   wherein the friction member further comprises an elevating mechanism corresponding to each of the friction rollers, the friction roller including a rotation shaft and a friction cloth on the rotation shaft,
   wherein the friction member controller comprises a first controller connected to the rotation shaft of the friction roller for driving the friction roller to rotate, and a second controller connected to the elevating mechanism for driving the elevating mechanism to ascend or descend, wherein the friction member comprises N friction rollers, the friction member further comprises a central rotation shaft and a connection shaft, wherein the N friction rollers are arranged at intervals around the central rotation shaft, each of the friction rollers is connected to the central rotation shaft through the connection shaft, an angle between adjacent connection shafts is 360°/N, N being a positive integer and N≥2,
   wherein the friction member controller further comprises a third controller connected to the central rotation shaft for controlling rotation of the central rotation shaft, the central rotation shaft is further connected to the elevating mechanism.

8. The rubbing alignment device according to claim 7, wherein the elevating mechanism comprises a roller clamping device, a support beam, a connection structure, a transmission member and a limit sensor, the roller clamping device being connected to the rotation shaft of the friction roller, the support beam being located between the roller clamping device and the connection structure, the transmission member being connected to the second controller.

* * * * *